(12) United States Patent
Turcovsky et al.

(10) Patent No.: US 7,595,446 B2
(45) Date of Patent: Sep. 29, 2009

(54) WALL MOUNTED ELECTRICAL APPARATUS

(75) Inventors: Gregory D. Turcovsky, Mentor, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 11 days.

(21) Appl. No.: 11/679,197

(22) Filed: Feb. 27, 2007

(65) Prior Publication Data

US 2008/0202787 A1    Aug. 28, 2008

Related U.S. Application Data

(60) Provisional application No. 60/848,847, filed on Oct. 2, 2006.

(51) Int. Cl.
    *H02G 3/08*    (2006.01)
(52) U.S. Cl. .............................. 174/50; 174/53; 174/58; 174/481; 220/3.2; 220/3.3; 248/906
(58) Field of Classification Search .................. 174/50, 174/53, 57, 58, 480, 481, 489; 220/3.2–3.9, 220/4.02; 248/906; 379/451
See application file for complete search history.

(56) References Cited

U.S. PATENT DOCUMENTS

| | | | |
|---|---|---|---|
| 1,694,054 A | 12/1928 | Both | |
| 2,775,812 A * | 1/1957 | Mohr | 248/906 |
| 2,828,394 A | 3/1958 | Mayzik | |
| 3,530,230 A | 9/1970 | Cormier et al. | |
| 3,622,029 A * | 11/1971 | Ware | 174/57 |
| 3,690,501 A | 9/1972 | Ware | |
| 3,745,664 A | 7/1973 | Altseimer | |
| 4,048,491 A | 9/1977 | Wessman | |
| 4,059,327 A | 11/1977 | Vann | |
| 4,451,108 A | 5/1984 | Skidmore | |
| 4,559,410 A | 12/1985 | Hostetter | |
| 4,603,229 A | 7/1986 | Menchetti | |
| 4,605,139 A * | 8/1986 | Dacar | 174/57 |
| 4,613,728 A | 9/1986 | Lathrop | |
| 4,642,418 A | 2/1987 | Menchetti | |
| 4,721,476 A * | 1/1988 | Zeliff et al. | 174/489 |
| 4,758,687 A | 7/1988 | Lathrop | |
| 4,778,399 A | 10/1988 | Schenk | |
| D308,464 S | 6/1990 | Freeman et al. | |
| RE33,305 E * | 8/1990 | Thayer | 248/906 |
| 4,972,045 A | 11/1990 | Primeau | |

(Continued)

OTHER PUBLICATIONS

Undated Photo Sheet No. 1 showing three views of prior art box.

(Continued)

*Primary Examiner*—Angel R Estrada
(74) *Attorney, Agent, or Firm*—Jones Day (57) ABSTRACT

A wire management box is sized to contained a high voltage plug and a low voltage terminal inward of a building wall surface. The box has an access opening that is sized for a user manually to reach through with the plug and the terminal. The box further has a high voltage wall that supports a high voltage outlet in an installed position spaced inward from the access opening, and a low voltage wall that supports a low voltage receptacle in an installed position spaced inward from the access opening adjacent to the outlet.

31 Claims, 5 Drawing Sheets

U.S. PATENT DOCUMENTS

| | | | |
|---|---|---|---|
| 4,988,832 A | 1/1991 | Shotey | |
| 5,114,365 A | 5/1992 | Thompson et al. | |
| 5,117,122 A | 5/1992 | Hogarth et al. | |
| 5,187,853 A | 2/1993 | Bardaville | |
| 5,243,134 A | 9/1993 | Nattel | |
| 5,257,946 A | 11/1993 | MacMillan et al. | |
| D343,825 S | 2/1994 | Enderby | |
| 5,297,690 A | 3/1994 | Bardaville | |
| D348,870 S | 7/1994 | Warrington | |
| 5,419,716 A | 5/1995 | Sciammarella et al. | |
| 5,486,650 A | 1/1996 | Yetter | |
| 5,574,256 A | 11/1996 | Cottone | |
| 5,596,174 A * | 1/1997 | Sapienza | 174/57 |
| 5,598,998 A | 2/1997 | Lynn | |
| 5,621,788 A * | 4/1997 | Eiken | 379/451 |
| 5,651,696 A | 7/1997 | Jennison | |
| 5,931,432 A | 8/1999 | Herold et al. | |
| 5,934,917 A | 8/1999 | Haut | |
| 6,026,605 A | 2/2000 | Tippett | |
| 6,093,890 A | 7/2000 | Gretz | |
| 6,102,360 A | 8/2000 | Clegg et al. | |
| 6,127,630 A | 10/2000 | McKenzie et al. | |
| 6,147,304 A | 11/2000 | Doherty | |
| 6,194,657 B1 | 2/2001 | Gretz | |
| 6,200,159 B1 | 3/2001 | Chou | |
| 6,207,895 B1 | 3/2001 | Engel | |
| 6,222,124 B1 | 4/2001 | Pritchard et al. | |
| 6,346,674 B1 | 2/2002 | Gretz | |
| 6,414,906 B1 | 7/2002 | Gaspari | |
| D462,939 S | 9/2002 | Dinh | |
| 6,444,906 B1 | 9/2002 | Lewis | |
| D463,969 S | 10/2002 | Luu | |
| 6,566,602 B1 | 5/2003 | Miller et al. | |
| 6,637,166 B2 | 10/2003 | Kinsey | |
| 6,753,471 B2 | 6/2004 | Johnson et al. | |
| 6,872,887 B2 | 3/2005 | Shotey et al. | |
| 6,894,222 B2 * | 5/2005 | Lalancette et al. | 174/58 |
| 6,956,171 B1 | 10/2005 | Gretz | |
| 7,044,318 B2 | 5/2006 | Gates, II | |
| 7,075,004 B1 * | 7/2006 | Gretz | 174/50 |
| 7,078,618 B2 | 7/2006 | Dinh | |
| D527,984 S | 9/2006 | Dinh | |
| 7,141,736 B2 * | 11/2006 | Plankell | 174/50 |
| D545,276 S | 6/2007 | Dinh | |
| 7,304,235 B1 * | 12/2007 | Gretz | 174/58 |
| 7,304,236 B1 * | 12/2007 | Gretz et al. | 174/58 |
| 2005/0183873 A1 | 8/2005 | Gottardo et al. | |

OTHER PUBLICATIONS

Undated Photo Sheet No. 2 showing one view of box with frame and two views of box alone.

Undated Photo Sheet No. 3 showing two views of box alone and one view of frame.

* cited by examiner

WALL MOUNTED ELECTRICAL APPARATUS

RELATED APPLICATIONS

This application claims the benefit of provisional U.S. Patent Application Ser. No. 60/848,847, filed Oct. 02, 2006, which is incorporated by reference.

TECHNICAL FIELD

This technology relates to electrical devices mounted on building walls.

BACKGROUND

A high voltage electrical outlet is typically contained in an outlet box that is mounted on a wall. The outlet box may be configured for attachment to a stud in a wall under construction, or may be configured as an "old work" box that is mounted in an opening cut into an existing wall A low voltage receptacle also may be mounted on a newly constructed wall or an existing wall, and in some cases is mounted on or beside a high voltage outlet box.

SUMMARY

The invention provides an apparatus that supports a high voltage electrical outlet and a low voltage electrical receptacle in adjacent positions recessed from a surface of a building wall.

The apparatus comprises a wire management box that is sized to contained a high voltage plug and a low voltage terminal inward of the building wall surface. The box has an access opening that is sized for a user manually to reach through with the plug and the terminal. The box further has a high voltage wall that supports the outlet in an installed position spaced inward from the access opening, and a low voltage wall that supports the receptacle in an installed position spaced inward from the access opening adjacent to the outlet.

A principal feature of the wire management box relates to the depth of the box inward from the access opening. The high voltage wall is deeper than the low voltage wall so that the box has a high voltage region that is deeper than the low voltage region. The greater depth may be provided in part by a bottom wall that faces outward of the access opening and extends between the high voltage wall and the low voltage wall at an acute angle to the low voltage wall. Preferably, the high voltage wall supports the electrical outlet in an installed position in which the outlet faces outward of the access opening at an acute angle to the building wall surface. The low voltage wall preferably supports the electrical receptacle in an installed position facing outward of the access opening in a direction perpendicular to the building wall surface.

Summarized differently, the invention provides an apparatus for supporting an electrical device within an opening to be cut into a building wall. The apparatus comprises a support structure that fits into the opening in the wall and supports the electrical device on the wall. The apparatus further includes a template having a projecting structure which, when pressed against the surface of the wall, impresses an outline of the opening to be cut into the wall.

DETAILED DESCRIPTION

The structures shown in the drawings have parts that are examples of the elements recited in the claims. The following description thus includes examples of how a person of ordinary skill in the art can make and use the claimed invention. It is presented here to meet the statutory requirements of written description, enablement, and best mode without imposing limitations that are not recited in the claims.

Figure 1:
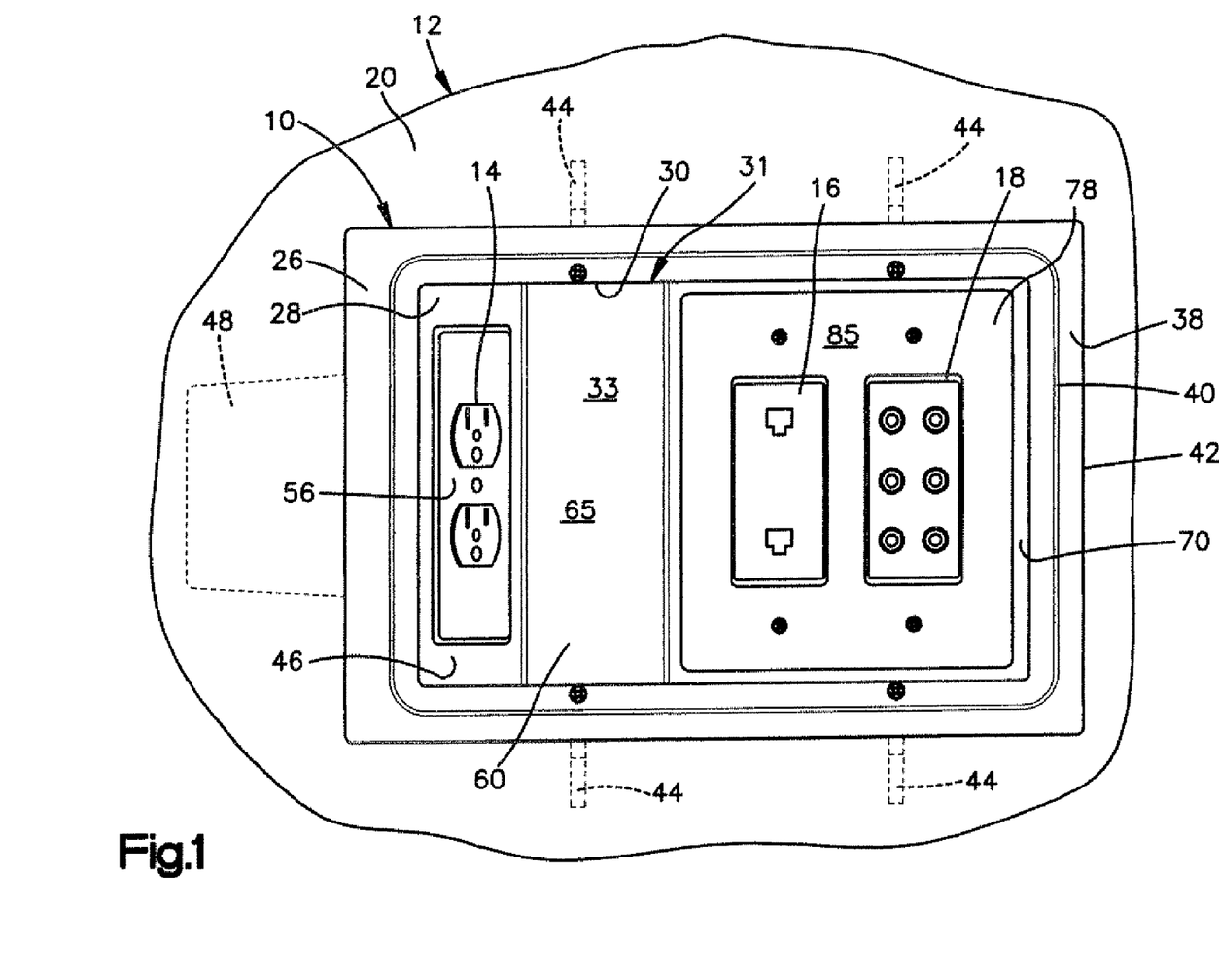
FIG. 1 is a front view of a wire management box in an installed position on a building wall, with a high voltage electrical box, a high voltage outlet, and a pair of low voltage receptacles supported on the wire management box.

The structure 10 of FIG. 1 is a wire management box that supports electrical receptacles at locations recessed into a building wall 12. This enables an appliance, such as a flat screen television, to be flush mounted on the wall 12 in a position covering the box 10 and the receptacles. More specifically, this example 10 of the claimed box holds a high voltage outlet 14 and a pair of low voltage receptacles 16 and 18 in vertically upright positions spaced back from the room side surface 20 of the wall 12. The depth of the box 10 provides clearance for plugs at the outlet 14 and terminals at the receptacles 16 and 18 to be recessed from the wall surface 20, and also provides wire management space for power cords and cables to be bundled into the box 10.

Figure 2:
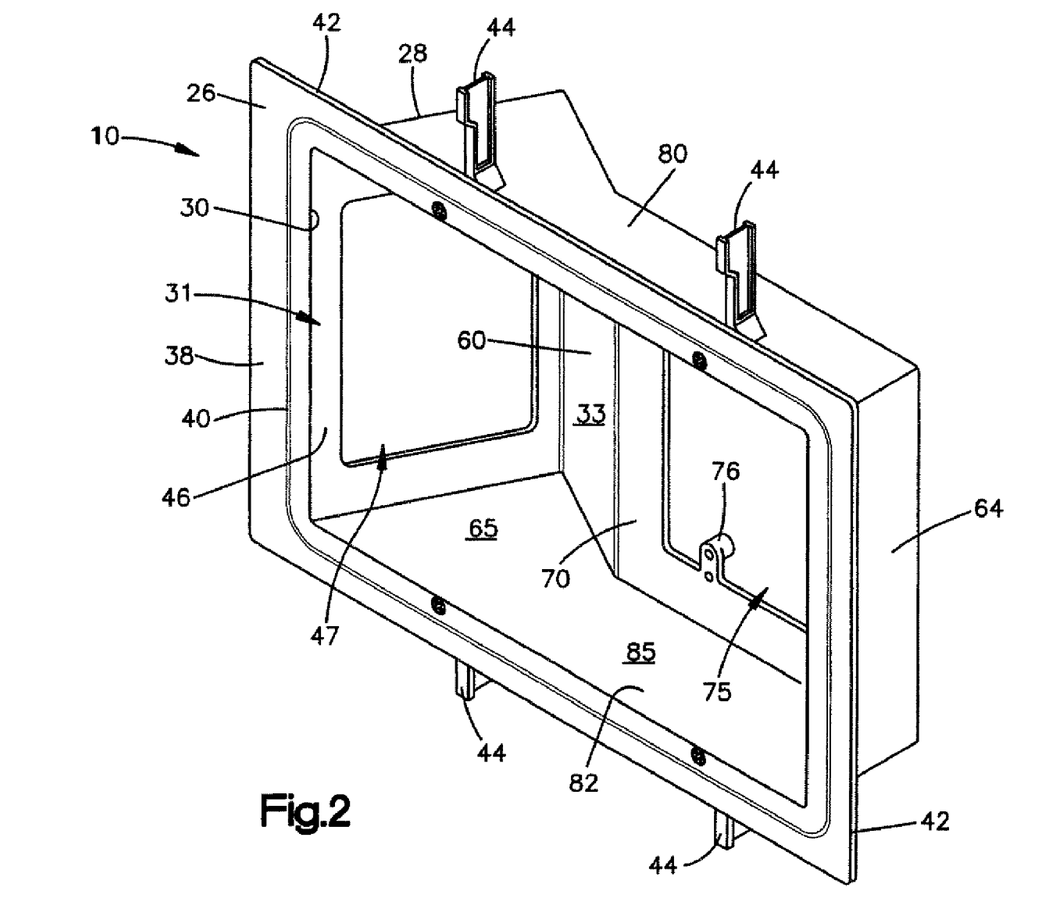
FIG. 2 is a perspective view of the wire management box.

The box 10 includes a one-piece molded plastic part defining a frame 26 and a wall structure 28. The frame 26 has a flat rectangular shape and provides a finished outer face of the box 10 beside the surrounding surface 20 of the wall 12. An inner edge 30 of the frame 26 defines a rectangular access opening 31. The access opening 31 is sized for a user manually to reach through with the electrical plugs and terminals, and the box 10 is configured for the access opening 31 to remain permanently open. As best shown in FIG. 2, the wall structure 28 defines the size and shape of the box interior 33 that is recessed inward of the access opening 31 at the frame 26.

When the box 10 is mounted on an existing wall as an "old work" box, the frame 26 can serve as a template for the installer to cut an opening into the wall. In the illustrated example the frame 26 has a planar rear side surface 36 and a planar front side surface 38. The front side surface 38 is a finished trim surface of the box 10. A rib 40 on the front side surface 38 extends around the frame 26 at a location between the periphery of the wall structure 28 and the peripheral edge 42 of the frame 26. The rib 40 has a short, narrow configuration projecting from the front side surface 38. The installer initially holds the box 10 to face the wall 12, and presses the front side surface 38 of the frame 26 forcefully against the wall 12. This causes the rib 40 to impress a shallow, narrow indentation in the surface 20 of the wall 12. The installer then places the box 10 aside and uses the indentation as a guide for cutting an opening into the wall 12.

Although the rib 40 in the illustrated example extends continuously around all four sides of the frame 26 to provide a continuous line for guiding the installer entirely around the opening to be cut into the wall 12, a plurality of less extensive ribs or an array of other indentation forming projections could alternatively provide a sufficient visual guide for cutting the opening in accordance with the invention. When the opening has been cut into the wall 12 in this manner, the box 10 is placed in its installed position by moving the wall structure 28 inward through the opening until the rear side surface 36 of the frame 26 moves into overlying contact with the room side surface 20 of the wall 12. Swing clamps 44 on the wall structure 28 are drawn against an inside surface of the wall 12 to clamp the box 10 in place in a known manner.

The wall structure 28 includes upper, lower, and side walls that extend inward from the frame 26, and further includes rear walls at the bottom of the box 10. A first side wall 46 serves as a high voltage wall for supporting the high voltage outlet 14. The first side wall 46 is skewed at an acute angle of preferably about 60°-70° from the frame 26. Accordingly, when the box 10 is installed as shown in FIG. 1, the first side wall 46 faces outward of the access opening 31 at that angle relative to the room side surface 20 of the building wall 12.

An opening 47 (FIG. 2) centered on the first side wall 46 is sized to receive a high voltage electrical outlet box 48 containing the outlet 14. The outlet box 48 is received through the opening 47 from the inside 33 of the wire management box 10, and has corner tabs (not shown) that rest against the first side wall 46. Abutment structures 50 on the outside of the first side wall 46 have rear edge surfaces 52 (FIG. 4) upon which swing clamps 54 on the outlet box 48 move against the wire management box 10 for attachment of the outlet box 48 to the first side wall 46. When thus supported on the first side wall 46, the high voltage outlet 14 and its faceplate 56 face outward of the access opening 31 in the same skewed orientation as the first side wall 46.

Figure 3:
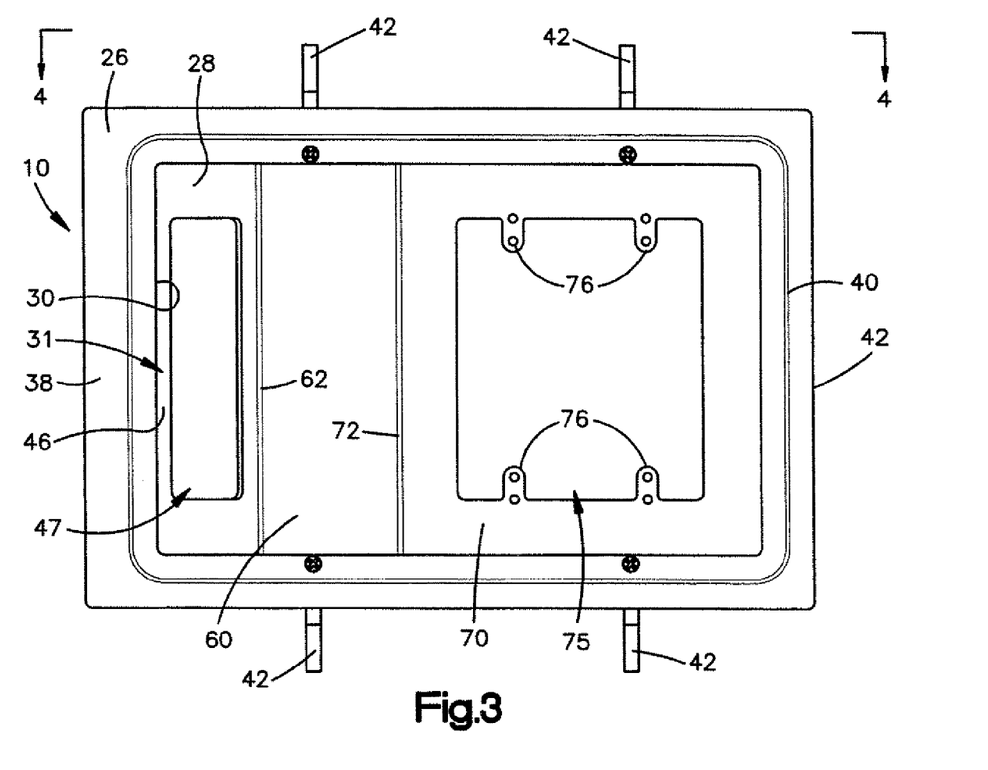
FIG. 3 is a front view of the wire management box.
Figure 4:
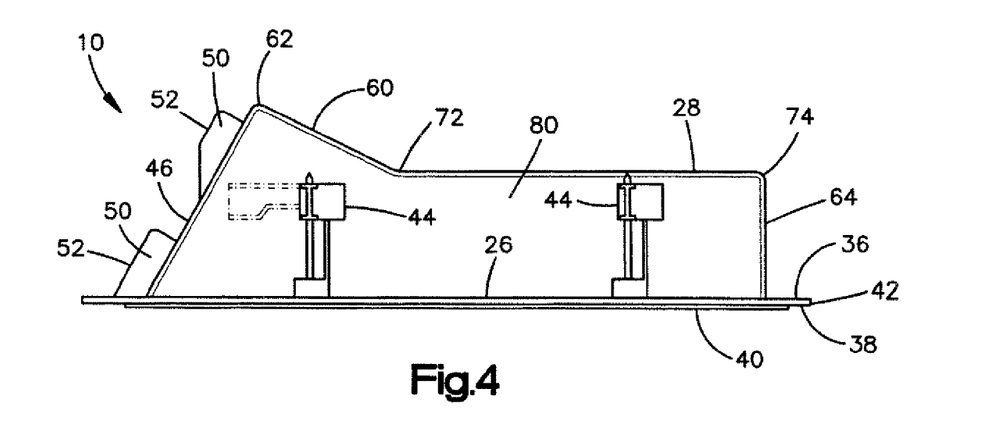
FIG. 4 is a top view of the wire management box taken on line 4-4 of FIG. 3.
Figure 5:
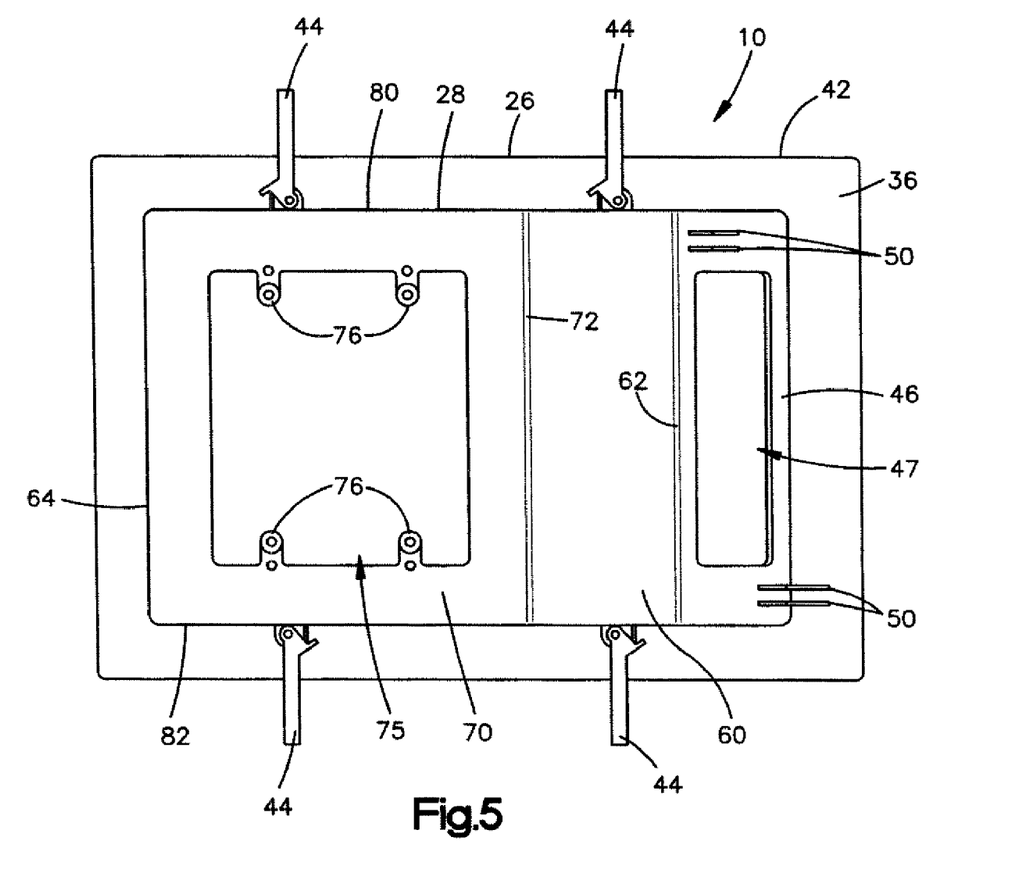
FIG. 5 is a rear view of the wire management box.

A first rear wall 60 extends partly across the bottom of the box 10 from the inner edge 62 (FIGS. 3 and 4) of the first side wall 46 toward the opposite side wall 64. The first rear wall 60 is perpendicular to the first side wall 46, as best shown in FIG. 4. The first rear wall 60 is thus skewed relative to the frame 26 at an acute angle complementary to the angle of the first side wall 46, i.e. an angle of about 30°-40° in the illustrated example. This provides the box interior 33 with a high voltage region 65 having depth defined by the first side wall 46 and the first rear wall 60.

A second rear wall 70 extends further across the bottom of the box 10 from the outer edge 72 of the first rear wall 60 to the inner edge 74 of the second side wall 64. The second rear wall 70 is parallel to the frame 26, and is thus parallel to the room side surface 20 of the building wall 12 when the box 10 is in the installed position of FIG. 1. This is the low voltage wall of the box 10, and has a centered opening 75 sized to receive the pair of low voltage receptacles 16 and 18. Mounting bosses 76 at the upper and lower edges of the opening 75 are configured to receive fasteners for the low voltage receptacles 16 and 18, and also to receive fasteners for a low voltage faceplate 78 over the receptacles 16 and 18. As shown in FIG. 1, the faceplate 78 and the receptacles 16 and 18 face outward of the access opening 31 in directions perpendicular to the room side surface 20 of the building wall 12.

The second side wall 64 of the box 10 is perpendicular to the second rear wall 70 and the frame 26, and joins the second rear wall 70 to the frame 26. Parallel upper and lower walls 80 and 82 complete the enclosure of the space 33 inward of the access opening 31. In this arrangement the recessed space 33 has a low voltage region 85 with a uniform depth extending inward from the frame 26 to the second rear wall 70. Tat depth is equal to the width of the second side wall 64, and is less than the depth that the first side wall 46 imparts to the high voltage region 65. Since a high voltage plug may require a recessed space that is deeper than the space required for a low voltage terminal to be recessed from the surrounding surface 20 of the building wall 12, this configuration of a deeper high voltage region 45 and a shallower low voltage region 85 is optimal for the volume and configuration of the box interior 33.

Figure 6:
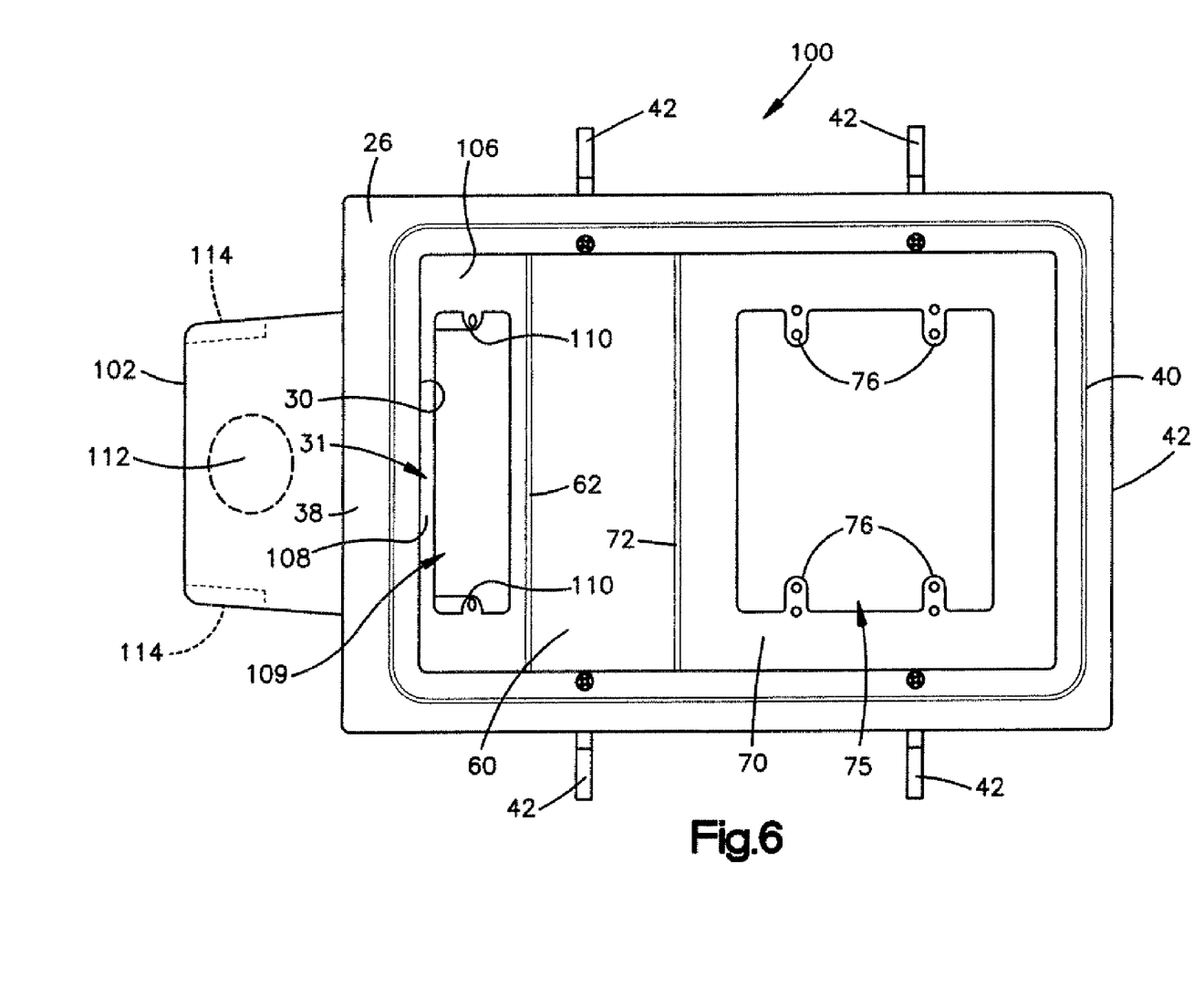
FIG. 6 is a front view of an alternative wire management box.

As shown in FIG. 6, an alternative wire management box 100 has many parts that are substantially the same as corresponding parts of the wire management box 10 of FIGS. 1-5. Those parts are indicated by the same reference numbers in FIGS. 1-5 and 6. However, the alternative box 100 differs by having an integrally formed high voltage electrical outlet box 102. Specifically, the alternative box 100 includes a one-piece molded plastic part defining a frame 26 and a wall structure 106. The outlet box 102 is an integral part of the wall structure 106 and projects to the rear from the first side wall 108 of the wall structure 106. Like the first side wall 46 of the wire management box 10 described above, the first side wall 108 of the alternative box 100 has a centered rectangular opening 109, but the opening 109 is slightly smaller because it is not sized to receive a separate outlet box. The integral outlet box 102 has a pair of mounting bosses 110 at the upper and lower ends of the opening 109 for fasteners that attach an outlet at those locations. The integral box 102 may further have knockouts 112 and cable clamps 114 as needed.

The patentable scope of the invention is defined by the claims, and may include other examples of how the invention can be made and used. Such other examples, which may be available either before or after the application filing date, are intended to be within the scope of the claims if they have structural elements that do not differ from the literal language of the claims, or if they have equivalent structural elements with insubstantial differences from the literal language of the claims.

What is claimed is:

1. An apparatus for supporting a high voltage electrical outlet and a low voltage electrical receptacle in adjacent positions recessed from a building wall surface, comprising:
    a wire management box having an interior sized to contain a high voltage plug and a low voltage terminal inward of the building wall surface, and having an access opening sized for a user manually to reach through with the plug and the terminal;
    the wire management box further having a high voltage wall configured to support the outlet in an installed position spaced inward from the access opening, and a low voltage wall configured to support the receptacle in an installed position spaced inward from the access opening adjacent to the outlet, with the low voltage wall defining the bottom of a low voltage region of the box interior and the high voltage wall defining a deeper bottom of a high voltage region of the box interior.

2. An apparatus as defined in claim 1 wherein the wire management box is configured to fit within the building wall in an installed position in which the high voltage wall is skewed relative to the building wall surface.

3. An apparatus as defined in claim 2 wherein the wire management box is configured for the low voltage wall to be parallel to the building wall surface when in the installed position.

4. An apparatus as defined in claim 1 wherein the wire management box has an integral frame surrounding the access opening, the frame has a rear surface configured to overlie the building wall surface when the wire management box is in an installed position, and the frame further has a finished front trim surface.

5. An apparatus as defined in claim 4 wherein the frame is configured for the access opening to remain permanently open when the wire management box is in the installed position.

6. An apparatus as defined in claim 1 wherein the high voltage wall of the wire management box is configured to support the outlet in a high voltage electrical outlet box.

7. An apparatus as defined in claim 6 wherein the high voltage wall of the wire management box has a rectangular opening sized to receive the outlet box for attachment to the wire management box.

8. An apparatus as defined in claim 6 wherein the outlet box is integral with the wire management box and projects from the high voltage wall of the wire management box.

9. An apparatus for supporting a high voltage electrical outlet and a low voltage electrical receptacle in adjacent positions recessed from a building wall surface, comprising:
    a wire management box sized to contain a high voltage plug and a low voltage terminal inward of the building wall surface, and having an access opening sized for a user manually to reach through with the plug and the terminal;
    the wire management box further having a high voltage wall configured to support the outlet in an installed position spaced inward from the access opening, a low voltage wall configured to support the receptacle in an installed position spaced inward from the access opening adjacent to the outlet, and a bottom wall that faces outward of the access opening and extends between the high voltage wall and the low voltage wall at an acute angle to the low voltage wall.

10. An apparatus as defined in claim 9 wherein the bottom wall extends fully from the high voltage wall to the low voltage wall at an acute angle to the low voltage wall.

11. An apparatus as defined in claim 9 wherein the bottom wall extends between the high voltage wall and the low voltage wall at a ninety degree angle to the high voltage wall.

12. An apparatus as defined in claim 9 wherein the bottom wall extends fully from the high voltage wall to the low voltage wall at a ninety degree angle to the high voltage wall.

13. An apparatus as defined in claim 9 wherein the wire management box is configured to fit within the building wall in an installed position in which the high voltage wall is skewed relative to the building wall surface.

14. An apparatus as defined in claim 13 wherein the wire management box is configured for the low voltage wall to be parallel to the building wall surface when in the installed position.

15. An apparatus as defined in claim 9 wherein the wire management box has an integral frame surrounding the access opening, the frame has a rear surface configured to overlie the building wall surface when the wire management box is in an installed position on the building wall, and the frame further has a finished outer trim surface.

16. An apparatus as defined in claim 15 wherein the frame is configured for the access opening to remain permanently open when the wire management box is in the installed position.

17. An apparatus as defined in claim 9 wherein the high voltage wall of the wire management box is configured to support the outlet in a high voltage electrical outlet box.

18. An apparatus as defined in claim 17 wherein the high voltage wall of the wire management box has a rectangular opening sized to receive the outlet box for attachment to the wire management box.

19. An apparatus as defined in claim 17 wherein outlet box is integral with the wire management box and projects from the high voltage wall of the wire management box.

20. An apparatus for supporting a high voltage electrical outlet and a low voltage electrical receptacle in adjacent positions recessed from a building wall surface, comprising:
    a wire management box configured to contain a high voltage plug and a low voltage terminal inward of the building wall surface, having an access opening sized for a user manually to reach through with the plug and the terminal, and configured for the access opening to remain permanently open when the wire management box is in an installed position on the building wall;
    the wire management box further having a high voltage wall configured to support the outlet in an installed position in which the outlet is spaced inward from the access opening and faces outward at an acute angle to the building wall surface, and a low voltage wall configured to support the receptacle in an installed position in which the receptacle is spaced inward from the access opening adjacent to the outlet and faces outward in a direction perpendicular to the building wall surface;
    wherein the low voltage wall is a major bottom wall which is spaced inward from the access opening, the high voltage wall is a side wall which extends inward from the access opening, and the wire management box further has a minor bottom wall which is spaced inward from the access opening, faces outward of the access opening, and extends between the side wall and the major bottom wall at an acute angle to the major bottom wall.

21. An apparatus as defined in claim 20 wherein the minor bottom wall extends fully from the side wall to the major bottom wall at an acute angle to the major bottom wall.

22. An apparatus as defined in claim 20 wherein the minor bottom wall extends between the side wall and the major bottom wall at a ninety degree angle to the side wall.

23. An apparatus as defined in claim 20 wherein the minor bottom wall extends fully from the side wall to the major bottom wall at a ninety degree angle to the side wall.

24. An apparatus as defined in claim 20 wherein the wire management box has an integral frame with a rear surface configured to overlie the building wall surface when the wire management box is in an installed position on the building wall, and the frame has an inner periphery defining the access opening.

25. An apparatus as defined in claim 20 wherein the high voltage wall of the wire management box is configured to support the outlet in a high voltage electrical outlet box.

26. An apparatus as defined in claim 25 wherein the high voltage wall of the wire management box has a rectangular opening sized to receive the outlet box for attachment to the wire management box.

27. An apparatus as defined in claim 25 wherein the outlet box is integral with the wire management box and projects from the high voltage wall of the wire management box.

28. An apparatus for supporting a high voltage electrical outlet and a low voltage electrical receptacle in adjacent positions recessed from a building wall surface, comprising:
    a wire management box sized to contain a high voltage plug and a low voltage terminal inward of the building wall surface, and having an access opening sized for a user manually to reach through with the plug and the terminal;
    the wire management box further having a high voltage wall configured to support the outlet in an installed position spaced inward from the access opening, and a low voltage wall configured to support the receptacle in an installed position spaced inward from the access opening adjacent to the outlet, with the high voltage wall having depth from the access opening in excess of the depth of the low voltage wall, whereby the wire management box has a low voltage region and a deeper high voltage region;

wherein the high voltage wall has an inner edge spaced inward from the low voltage wall, and the wire management box further has a rear wall that faces outward through the access opening and has depth from the access opening that decreases from the inner edge of the high voltage wall outward to the low voltage wall.

29. An apparatus for supporting an electrical device within an opening to be cut into a building wall, comprising:
   a support structure configured to be installed in the opening in the building wall and to support the electrical device on the building wall; and
   a template having a projecting structure configured to be pressed against the surface of the building wall to impresses an outline of the opening to be cut into the wall;
   wherein the projecting structure is a single rib extending as a continuous boundary of an area having the size and shape of the opening to be cut into the building wall.

30. An apparatus for supporting an electrical device within an opening to be cut into a building wall, comprising:
   a support structure configured to be installed in the opening in the building wall and to support the electrical device on the building wall; and
   a template having a projecting structure configured to be pressed against the surface of the building wall to impresses an outline of the opening to be cut into the wall;
   wherein the template is a frame configured to be mounted on the building wall in an installed position with a rear side surface of the frame overlying the surface of the building wall around the opening in the building wall, and the projecting structure projects from a front side surface of the frame; and
   wherein the projecting structure comprises a rib that extends as a continuous boundary of an area having the size and shape of the opening to be cut into the building wall.

31. An apparatus for supporting an electrical device within an opening to be cut into a building wall, comprising:
   a box-shaped wall structure configured to contain the electrical device and to be installed by insertion through the opening in the building wall; and
   a frame that is integral with the box-shaped wall structure, the frame having a rear side surface configured to overlie the surface of the building wall around the opening in the building wall, and having a front side surface with a projecting structure configured to be pressed against the surface of the building wall to impress an outline of the opening to be cut into the building wall;
   wherein the projecting structure comprises a rib that extends as a continuous boundary of an area having the size and shape of the opening to be cut into the building wall.

* * * * *